T. F. Baker,
Jail Grating.
No. 90,219.   Patented May 18, 1869.
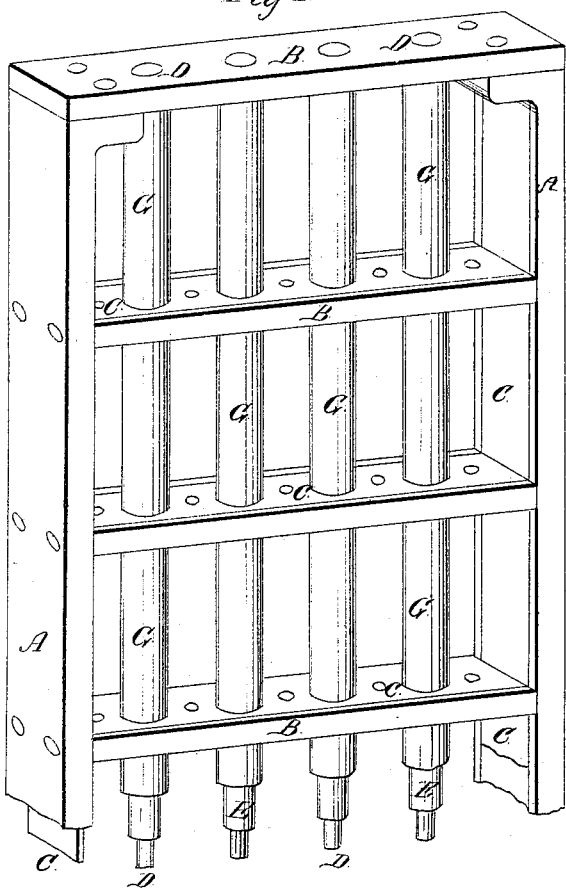
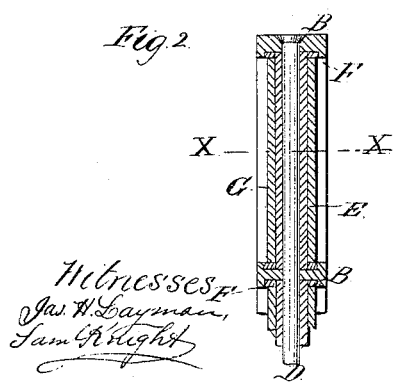
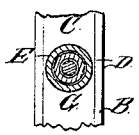
Witnesses
Jas. H. Layman
Saml Knight
Inventor
Thos. F. Baker
By Knight Bros
Attys

THOMAS F. BAKER, OF CINCINNATI, OHIO.

Letters Patent No. 90,219, dated May 18, 1869.

IMPROVED PRISON-GRATING.

The Schedule referred to in these Letters Patent and making part of the same.

*To whom it may concern:*

Be it known that I, THOMAS F. BAKER, of Cincinnati, Hamilton county, Ohio, have invented a new and useful Improvement in Jail-Doors and Gratings; and I hereby declare the following to be a full, clear, and exact description thereof, reference being had to the accompanying drawings, making part of my specification.

This invention relates to a mode of constructing the bars of jail-gratings, which renders them impregnable to any attempts to saw the same asunder on the part of prisoners or others.

Figure 1 is a perspective view of a portion of a jail-door or grating, embodying my invention.

Figure 2 is a vertical section showing two of the collars in position.

Figure 3 is a horizontal section at the line X X.

A are two longitudinal bars or stiles, and

B are cross-bars or rails firmly riveted to the former.

Both stiles and rails have steel pieces, C, riveted, welded, or otherwise firmly attached to all their accessible surfaces.

D are wrought-iron rods extending vertically through the rails from top to bottom, and firmly riveted at their ends.

Those portions of each rod between the rails, are encircled by steel sleeves, E, whose ends pass into counter-bores, F, in the steel facing, so as to preclude the insertion of a saw or other instrument. Said sleeves are capable of rotating easily under the action of a saw.

These sleeves are in my preferred form enclosed in an external sleeve, G, of wrought or cast-iron, which may be either fixed or rotary, and are useful to prevent the inner sleeve being held against rotation under the action of a saw or file. But these external sleeves may, in some instances, be omitted. Moreover, the rails and stiles may be made wholly of steel.

It will be observed that these steel sleeves are so short as to be easily brought to a hard temper without such curvature as would prevent the insertion of the rods.

I have selected, for illustration, the form successfully introduced by me, but may vary the same as cases or circumstances may suggest.

I claim herein as new, and of my invention—

1. The mode of constructing a jail-door or grating with steel, or steel-faced stiles and rails A B, rods D, and steel sleeves E, countersunk into the rails, as set forth.

2. The combination of the two concentric sleeves E and G, substantially as and for the purposes set forth.

In testimony of which invention, I hereunto set my hand.

T. F. BAKER.

Witnesses:
   GEO. H. KNIGHT,
   JAMES H. LAYMAN.